Patented June 20, 1950

2,512,058

UNITED STATES PATENT OFFICE 2,512,058

TITANATED ORGANO-SILICON-OXY COMPOUNDS

Hugh C. Gulledge, Wilmington, Del., assignor to E. I. du Pont de Nemours & Company, Wilmington, Del., a corporation of Delaware No Drawing. Application April 5, 1948, Serial No. 19,162

12 Claims. (Cl. 260—46.5)

This invention relates to the preparation of improved siloxane type compounds. More particularly it relates to the modification of silicone type resins by the addition thereto of a reactive compound of an amphoteric element.

Rapid advances have been made in the chemistry of silicon and commercially-useful compounds in which silicon is attached to one or more carbon atoms have been offered in the trade. Alloys of silicon have been found to react with alkyl halides, and alkyl or aryl halides have been reacted with silicon tetrahalides via the Grignard method, to give organosilicon halides or organo-halogenosilanes, e. g., alkyl- and aryl-halogenosilanes having the formula $R_nSiX_{4-n}$, wherein $n$ is an integer from 1 to 3 and R comprise substituted or unsubstituted mono-, di- or tri-alkyl, aryl, aralkyl, alkaryl substitutents or mixtures thereof, such as methyl, ethyl, propyl, butyl, phenyl, benzyl, tolyl, naphthyl, and the like, and X is chlorine, bromine, iodine or fluorine. These, particularly the alkylhalogenosilanes, are useful intermediates for organosilicon compound preparation, since their halogen atoms hydrolyze to give the hydroxy compounds known as organo-silicols or organosilanols ($R_nSi(OH)_{4-n}$). Hydrochloric acid is split off in this reaction, leaving silicon attached to both oxygen and carbon. These organo-silicols may be condensed by heat through the removal of water to give resinous materials known as silicones or organopolysiloxanes. The character of the silicone will depend upon the amount of polymerization carried out as well as the amount and nature of the organic radicals attached to the silicon atoms. As indicated, aryl radicals as well as alkyl radicals may be present in the organo-silanols, and in the resulting silicones, to give modified properties; and it is obvious that further modifications may be had by changing the ratio of hydroxy groups to organic groups attached to any single atom. In this way, a wide variety of silicon compounds are produced, some of which may be used as paint vehicles. These are the more highly polymerized silicone products, as they give useful paint films.

The films produced from the drying of silicone solutions are somewhat deficient in hardness and are not equal to urea-alkyds for use in the production of refrigerator and other baked enamels. The silicone films also transmit ultra-violet light and, for certain uses, this is undesirable. The heat resistance of the film is particularly good. My invention is directed to the correction of the weaknesses indicated. Accordingly, an object of this invention is the production of film-forming silicon compounds possessing good gloss and high durability, due to hardness of the film, and possessing other properties, such as good color and ease of pigmentation. A further object is the production of a titanium-containing paint vehicle of great transparency and excellent color suitable for use as a varnish. A still further object is the production of a paint vehicle particularly adapted to the manufacture of white baking enamels, and particularly well suited for incorporation therein of titanium oxide pigment, due to its ease of dispersion in the titanium-containing silicone liquid. Further objects will appear hereinafter.

The above and other objects are attained by my invention which broadly comprises reacting an organo-silicon-oxy compound with an organic titanate, whereby the titanium becomes combined with the silicon through oxygen to give a valuable condensation product or a modified organo-silicon compound or organopolysiloxane.

In a specific and preferred embodiment of this invention, an organo-silicol compound or organo-silanol having the general formula $R_nSi(OH)_{4-n}$, wherein R is an organic radical containing less than 20 carbon atoms (ethyl, methyl, propyl, aryl, aralkyl, etc.) and $n$ is an integer from one to three, is reacted with an ester of titanic acid, e. g., tetraethyl titanate. The reaction is caused to take place in the liquid state and during the reaction titanium attaches itself to the silicon compound through an oxygen linkage, an an alcohol is set free. Refluxing conditions may be used to obtain the proper reaction and to modify the product through polymerization, if such is desired.

The organo-silicon compounds to be used in the invention comprise the pure silanols containing from 1 to 3 hydroxy groups per silicon atom; the siloxanes obtained by condensation of such silanols; or other silicone type compounds in which a portion of the water has been evolved during the condensation of the compound by polymerization, such as the linear types dimethyl silicone, ethyl methyl silicone, diethyl silicone, etc., all of which are represented by the formula

and the cross-linked types such as monomethyl or monoethyl silicones, represented by the formula

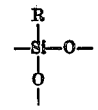

wherein R and R' are the same or different hydrocarbon radicals, such as alkyl, aryl, cycloalkyl, aralkyl, alkaryl, and preferably containing less than 20 carbon atoms. Mixtures or co-condensates of such materials are also useful. The reaction takes place in the liquid condition, and accordingly the silicon compound must either be a liquid or must be present as a solution in a suitable solvent which is compatible with the titanium compound employed. Among other specific types of organosilicon compounds utilizable herein are such silanols as trimethylsilanol, diethylsilanediol, triethylsilanol, diphenylsilanediol, etc., and the silanols and polymeric diols listed at p. 124 of Chemical Reviews 41 #1, August 1947.

The esters of titanic acid hydrolyze quite readily in the presence of water, so that the reaction should be caused to take place in the absence of free water. This willingness of the titanium compound to undergo change makes for its rapid reaction with the silicon compound and the obtainment of a clear homogeneous product without resort to high temperatures or pressures and without the use of catalysts.

Tetraethyl titanate is a very suitable source of titanium for my process. It is readily obtained by known methods through the reaction of sodium ethylate and titanium chloride; or through the reaction of the tetrachloride with anhydrous ethyl alcohol, using ammonia as a neutralizing agent. Other esters of titanic acid may be made in this manner, including the methyl, propyl, butyl and amyl compounds. Isoamyl titanate is well suited for use in the process, but obviously the ethyl compound is the less expensive and its use is recommended either alone or in conjunction with one or more of the other titanium compounds. In addition to the alkyl titanates mentioned, other organic titanates can be used, including aryl titanates such as tetraphenyl titanate resulting from the reaction of phenol and titanium tetrachloride; or the reaction product from salicylic acid with titanium tetrachloride; aralkyl titanates such as tetrabenzyl titanate; alkaryl titanates such as tetracresyl titanate, etc.

The following examples are given in illustration of my invention but are not to be considered as in limitation of its underlying principles or scope:

*Example I*

25 parts by weight of monoethyltrichlorosilane and 75 parts of diethyldichlorosilane were mixed in ether solution and added to cracked ice representing water in excess of the amount required for hydrolysis of the silanes. An ether layer containing the hydrolysis product separated from the excess water containing liberated hydrogen chloride. This ether layer was removed and the solvent ether evaporated off. The residue was then added to tetraethyl titanate in the proportion of 40 parts by weight of the hydrolysis product to 11.5 parts of the titanate (10 parts by weight of $TiO_2$ per 100 parts of the hydrolysate). This mixture was heated for eight hours at 200° C. under refluxing conditions and with the avoidance of moisture. Refluxing was then discontinued and the mixture heated for a similar period of time at 200° C. in the open. A clear, viscous, homogeneous resin with a slight yellow color was obtained. The product was found to contain 9.5% $TiO_2$ by analysis and was soluble in the ordinary hydrocarbon solvents.

*Example II*

25 parts by weight of the residual hydrolysate obtained in Example I were mixed with 40 parts by weight of tetraethyl titanate. This mixture was heated at 200° C. for eight hours under refluxing conditions as in Example I. Thereafter it was heated in the open at 200° C. for four hours. A very viscous, homogeneous, slightly yellow resin resulted. This resin was soluble in the usual hydrocarbon solvents and was found to contain 50.1% $TiO_2$. The resinous material when dissolved in organic solvents tended to give a jelly-like mass, and a 50% xylol solution set to a firm gel when allowed to stand for one day.

*Example III*

2 mols of diphenylsilanediol and 1 mol of tetraethyl titanate were dissolved in ethyl ether. The resulting solution was heated and refluxed for five hours and the ether then evaporated off. The residue was a solid, resinous titanated silicone.

*Example IV*

Four molar parts of trimethylmonochlorosilane dissolved in ether were added to cracked ice at such a rate that the temperature did not exceed 5° C. The ether layer containing the hydrolysis product was separated from the water layer and was dried over anhydrous sodium sulfate. This dry ether solution was added to one molar part of tetraisoamyl titanate. This mixture was refluxed 1 hour on the steam bath. The solvent ether was then removed by distillation. The mixture was then heated for 3 hours at 200° C. The clear homogeneous gel-like product was soluble in the more common hydrocarbon solvents.

*Example V*

Four molar parts of triethylmonochlorosilane dissolved in ether were hydrolyzed by adding the solution to cracked ice. The ether layer containing the hydrolysate was separated from the water layer. The ether was distilled from the hydrolysis product, leaving the liquid silanol. This was added to one molar part of tetraisoamyl titanate. The mixture was heated for 2 hours at 200° C. using an air-cooled reflux to prevent loss of reactants. Heating was continued for 2 hours at 200° C. without reflux in order to remove the isoamyl alcohol formed during the reaction. The titanated triethyl siloxane remained as a viscous homogeneous product soluble in hydrocarbon solvents.

The resinous products of Examples I and II were found useful in coating compositions and varnishes and were particularly well-suited for blending with other paint ingredients to alter the film-forming properties. Products containing lesser quantities of $TiO_2$, i. e., silicones containing up to about 20% $TiO_2$, are the more suitable for use in enamels and varnishes. These modified silicone vehicles are easily pigmented with titanium oxide. It is believed that this is due to the dispersing effect of the titanated vehicles.

Titanated organo-silicon-oxy compounds, such as the one resulting from the procedure of Example II, are useful to change the viscosity of paints, varnishes, or other organic liquids. The flow properties, which are important in such film-forming liquids, may be thus modified without sacrifice of properties usually lost by use of prior art thickening agents.

The products obtained by interaction of the liquid organic titanates and a liquid silicone resin are particularly useful in paints and varnishes and may contain from about 1 to about 20 or more parts of $TiO_2$ per 100 parts of the silicone compound. An equivalent product is obtained by starting with the titanium ester and a silanol having more than one hydroxyl group, or a resinous silicon composition intermediate between such a silanol and a silicone, and effecting the heating necessary to polymerize further the silicon compound at the same time that titanation occurs. Other useful but non-resinous compounds are obtained by reaction of triorganosilanols with the titanate, whereby relatively simple titanated siloxanes are produced as in Examples IV and V.

The chemical composition of the titanated siloxane may be varied widely by selection of the silicon compounds or compositions to be used, i. e., the number and nature of the alkyl and/or aryl groups attached to silicon, the number of hydroxy or oxy groups similarly held by silicon, the degree of cross-linkage, the extent of polymerization, the amount of titanation, etc. It can be seen that with such a large number of variables, my process is quite flexible and the titanated products may be used in a wide variety of compositions.

As explained above, the invention provides titanated siloxanes and silicone resinous products of wide usefulness. Two ingredients are essential in the process, one being a reactive organic titanate, the other being an organo-silicon compound having oxygen or one or more hydroxy groups attached to the silicon atom. The silicon compound may be an organo-silanol or it may be a condensation product thereof. The silicon compound and the titanium compound must be liquids or in solution to obtain the reaction. The titanium compound is usually an ester of titanic acid and an alcohol. Solutions of silicones and products intermediate between the pure organosilanol and the final silicone are useful in the process and the same is true of mixtures of different organo-silanols and of various other oxyorgano-silicon compounds (this term "oxy-organo-silicon compound" is used to include organo-silicols (silanols), polymeric diols, polyorganosiloxanes, or organopolysiloxanes obtained upon condensing the corresponding silanols

hereinbefore noted), silicones and intermediate compounds which have in common silicon attached to both oxygen and carbon.)

Similarly, the term "hydrolysis product" here and in the appended claims includes both silanol and siloxane types of reactants, since hydrolysis of an organohalogenosilane usually results in both types of product due to the fact the heat of reaction effects some polymerization of the silanol to produce a polysiloxane.

Although specific heating temperatures have been mentioned as utilizable herein, the invention is not limited thereto since, as is known, silanols readily condense with loss of water to form intermediate condensation products. The application of heat therefore merely accelerates the reaction herein contemplated, and hence resort to temperatures ranging from about 100° C. to 300° C. in such reaction is merely preferred. The reaction can be effected at either atmospheric, superatmospheric, or sub-atmospheric pressures, as desired.

This application is a continuation-in-part of my copending application Serial Number 706,045, filed October 26, 1946, now abandoned.

I claim as my invention:

1. A process for preparing improved siloxane products which comprises reacting together as an anhydrous liquid mixture an ester of titanic acid with a hydrolysis product of an organohalosilane having the general formula $R_nSiX_{4-n}$, wherein R is a hydrocarbon radical containing less than 20 carbon atoms, X is a halogen, and $n$ is an integer from 1 to 3.

2. A process for the production of a modified siloxane product which comprises reacting by heating to a temperature ranging from 100–300° C. an anhydrous liquid mixture containing an ester of titanic acid and a hydrolysis product of an organohalosilane having the general formula $R_nSiX_{4-n}$, wherein $n$ is an integer from 1 to 3, X is a halogen, and R is a hydrocarbon radical containing less than 20 carbon atoms.

3. A process for the production of modified siloxane products which comprises reacting in anhydrous solution an alkyl titanate with a hydrolysis product of an organohalosilane having the general formula $R_nSiX_{4-n}$, wherein R is a hydrocarbon radical containing less than 20 carbon atoms, X is a halogen, and $n$ is an integer from 1 to 3.

4. A process for the production of a modified siloxane product which comprises reacting by heating to a temperature ranging from 100–300° C. under anhydrous conditions tetraethyl titanate with a hydrolysis product of an organohalosilane having the general formula $R_nSiX_{4-n}$, wherein R is a hydrocarbon radical containing less than 20 carbon atoms, X is a halogen, and $n$ is an integer from 1 to 3.

5. A method for producing a modified silicone resin comprising reacting in anhydrous liquid state tetraethyl titanate with a hydrolysis product of a mixture of an organohalosilane of the formula $R_2SiX_2$ with an organohalosilane of the formula $RSiX_3$, wherein R in each of said formulae is a hydrocarbon radical containing less than 20 carbon atoms and X is a halogen.

6. A method for producing a modified siloxane product comprising reacting in anhydrous liquid state and at elevated temperatures tetraethyl titanate with an organosilanol-siloxane mixture, said mixture being the hydrolysis product of an organohalosilane having the general formula $R_nSiX_{4-n}$, wherein R is a hydrocarbon radical containing less than 20 carbon atoms, X is a halogen, and $n$ is an integer from 1 to 3.

7. A modified organopolysiloxane product containing titanium and produced by reacting as an anhydrous liquid mixture an ester of titanic acid with the hydrolysis product of an organohalosilane having the general formula $R_nSiX_{4-n}$, wherein R is a hydrocarbon radical containing less than 20 carbon atoms, X is a halogen, and $n$ is an integer from 1 to 3.

8. Modified diphenylsiloxane containing titanium and produced by reacting as an anhydrous liquid mixture diphenylsilanediol with an ester of titanic acid.

9. Modified trimethylsiloxane containing titanium produced by reacting as an anhydrous liquid mixture trimethylsilanol with an ester of titanic acid.

10. Modified triethylsilanol as produced by reacting as an anhydrous liquid mixture triethylsilanol with an ester of titanic acid.

11. A method for preparing an improved siloxane product comprising hydrolyzing an organohalosilane having the general formula $R_nSiX_{4-n}$, wherein R is an organic hydrocarbon radical containing less than 20 carbon atoms, X is a halogen, and $n$ is an integer from 1 to 3, and reacting in anhydrous liquid state and at a temperature ranging from 100° C. to 300° C. the resulting hydrolysis product with an ester of titanic acid.

12. A method for preparing an improved siloxane product which comprises hydrolyzing an organohalosilane having the general formula $R_nSiX_{4-n}$, wherein R is an organic hydrocarbon radical containing less than 20 carbon atoms, X is a halogen, and $n$ is an integer from 1 to 3, and reacting in anhydrous liquid mixture and at a temperature ranging from 100° C. to 300° C. the resulting hydrolysis product with tetraethyl titanate.

HUGH C. GULLEDGE.

REFERENCES CITED

The following references are of record in the file of this patent:

Rochow, Chemistry of the Silicones, Wiley, 1946, pp. 34 and 35.